United States Patent [19]
Colville

[11] 4,353,275
[45] Oct. 12, 1982

[54] SAWING APPARATUS

[76] Inventor: Hume W. Colville, Murray St., Barham, New South Wales, Australia

[21] Appl. No.: 189,985

[22] Filed: Sep. 23, 1980

[30] Foreign Application Priority Data

Sep. 27, 1980 [AU] Australia .............................. PE0671

[51] Int. Cl.³ .............................................. B27B 5/10
[52] U.S. Cl. ...................................... 83/488; 30/379; 83/928
[58] Field of Search ................. 30/379, 379.5; 83/488, 83/928; 299/72, 73, 75

[56] References Cited

U.S. PATENT DOCUMENTS 3,032,956  5/1962  Mullet ............................... 30/379 X
3,785,705  1/1974  Binger ............................... 83/928 X

FOREIGN PATENT DOCUMENTS 2218921  10/1973  Fed. Rep. of Germany ........ 299/72

Primary Examiner—James M. Meister
Attorney, Agent, or Firm—Sughrue, Mion, Zinn, Macpeak & Seas

[57] ABSTRACT

Sawing apparatus mountable to the side of a tractor and having a boom which extends outwardly from the tractor. The boom carries a motor driven circular saw which is movable along the length of the boom for making a saw cut in a vertical plane parallel to the boom. The apparatus is arranged for movement of the boom, both vertically as well as horizontally in the front to rear direction of the tractor. The angle of the boom to the horizontal is also variable. The boom may be swung over a range of positions about a generally vertical axis and to a position at which it extends in the front to rear direction of the tractor.

18 Claims, 8 Drawing Figures

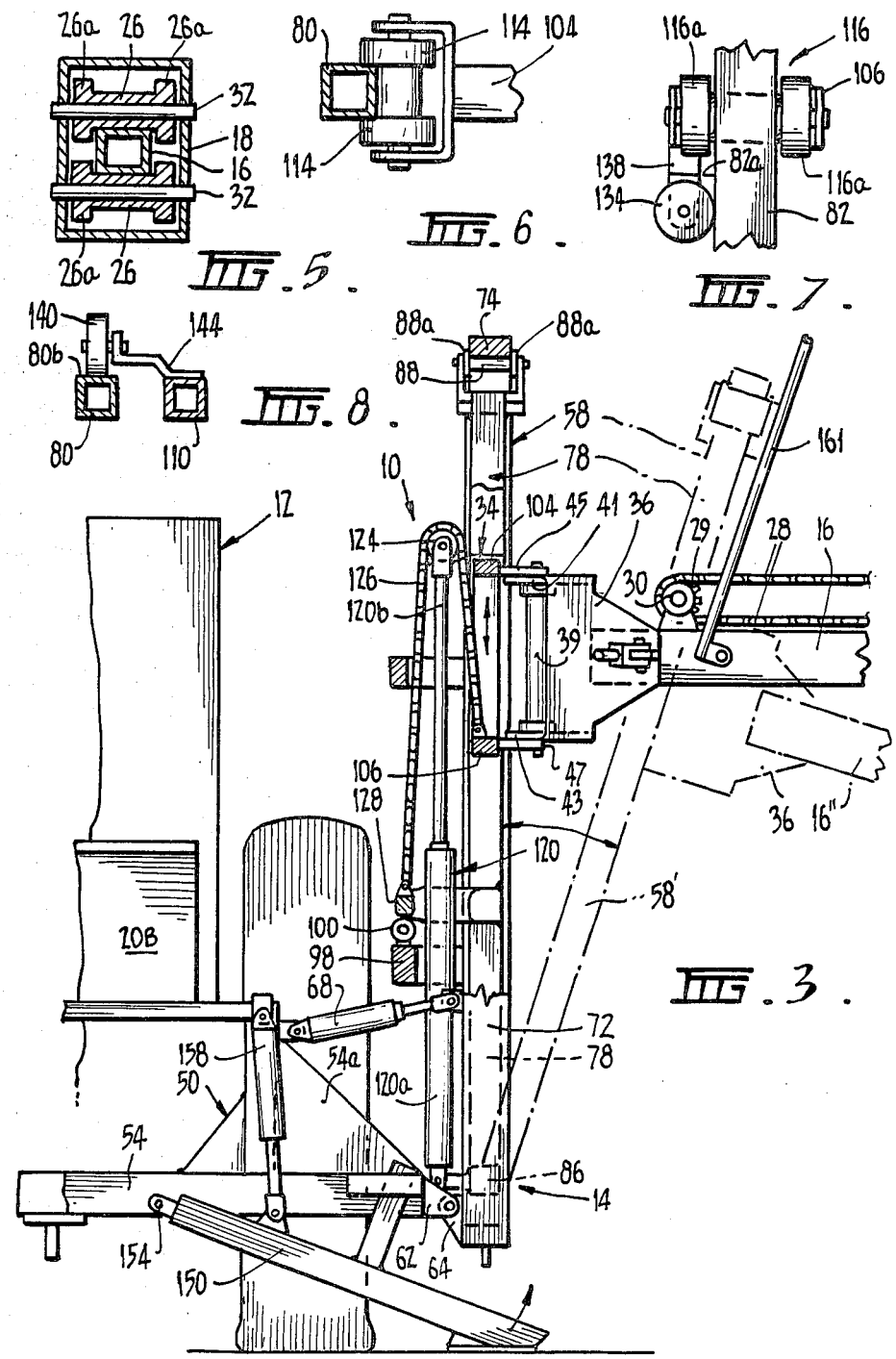

SAWING APPARATUS

BACKGROUND OF THE INVENTION

Field of the Invention

This invention relates to sawing apparatus.

BRIEF SUMMARY OF THE INVENTION

According to the present invention there is provided sawing apparatus comprising a boom carrying a carriage movable lengthwise along the boom and at least adapted to carry a saw device, support structure adapted to be secured to a vehicle and carrying said boom, said boom being pivotal relative to said support structure so as to be positionable, by pivotal movement, at least at a first position at which, in use of the sawing apparatus with said support structure attached said vehicle and said carriage carrying said saw device, the boom extends sidewardly of the vehicle for use of the sawing apparatus by operating said saw device and moving it lengthwise of said boom, and at a second position at which, in use of the sawing apparatus with the support structure secured to said vehicle and said carriage carrying said saw device, the boom extends generally parallel to the driving direction of the vehicle for transport of the saw device.

The support structure may be arranged for movement of the boom over a range of vertical and/or horizontal positions and may also be arranged for tilting of the boom. Preferably, the support structure is attachable to the side of the vehicle. The saw device may be a circular saw.

BRIEF DESCRIPTION OF THE DRAWINGS

The invention is further described by way of example with reference to the accompanying drawings in which:

FIG. 3 is a cross-section on the line 3—3 in FIG. 2;

FIG. 4 is a view on the line 4—4 in FIG. 1;

FIG. 5 is a cross-section on the line 5—5 in FIG. 4;

FIG. 6 is an enlarged scrap section on the line 6—6 in FIG. 2;

FIG. 7 is an enlarged scrap section on the line 7—7 in FIG. 2; and

FIG. 8 is an enlarged scrap view on the line 8—8 in FIG. 2.

DETAILED DESCRIPTION

Figure 1:
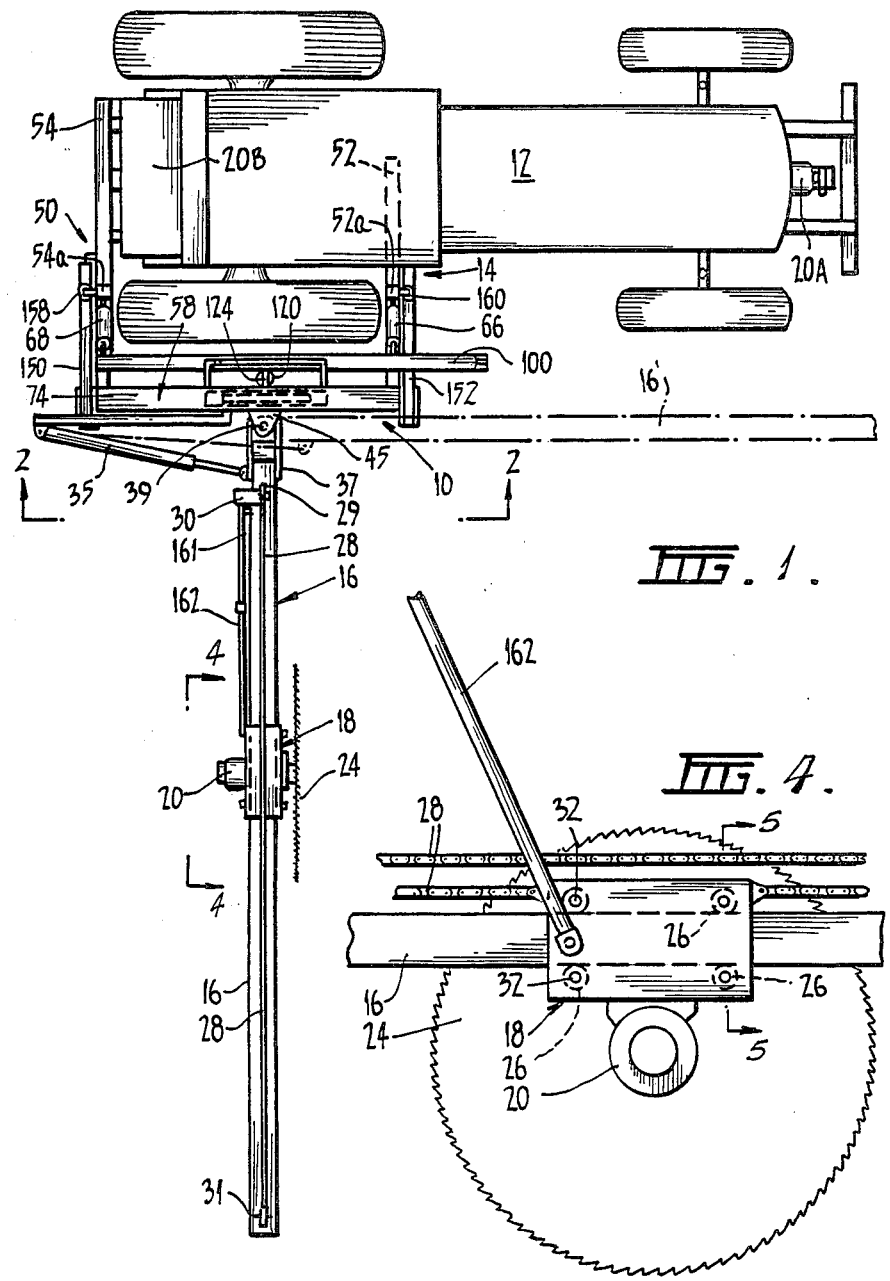
FIG. 1 is a plan view of a tractor fitted with a sawing apparatus constructed in accordance with the invention.

The sawing apparatus 10 shown is connected to one side of a tractor 12. The apparatus 10 includes a support structure 14 which supports a boom 16 on which is carried a carriage 18. Carriage 18 carries a hydraulic motor 20 and the output shaft of the hydraulic motor is connected to a circular saw blade 24 so that by operation of the hydraulic motor the saw blade 24 is rotated for sawing. As shown, the saw blade is arranged in a vertical plane to one side of the boom 16.

Carriage 18 is supported for movement along boom 16 by four roller elements 26, there being two pairs of such roller elements, one pair positioned to either lengthwise end of the carriage and each pair comprising upper and lower roller elements positioned to roll on respective upper and lower ones of the four side faces of the generally rectangularly cross-sectioned boom 16.

Each roller element 26 runs on a separate axle 32 on carriage 16 and has end flanges 26a which run outside the vertical faces of the boom to limit side to side movement of the carriage. In this manner, the carriage 18 is readily movable along the boom whilst being guided to maintain the plane of the saw blade 24 vertical.

An endless chain 28 is arranged to run around end sprockets 29, 31 mounted for free rotation at respective inner and outer ends of boom 16. End sprocket 29 is secured to the output shaft of a hydraulic motor 30 positioned on boom 16. The carriage 18 is connected to chain 28 so that, when motor 30 is operated, the carriage 18 is moved lengthwise along the boom pursuant to movement of the chain 28.

Boom 16 is pivotally mounted on a first sub-frame forming part of support structure 14. Thus, the inner end of boom 16 has a pair of upright plates 35, 37 welded to either side thereof. These are interconnected by upper and lower horizontal plates 41, 43. A heavy pivot pin 39 extends through and between plates 41, 43. Projecting ends of pin 39 are received for free rotation in respective upper and lower lugs 45, 47 on sub-frame 34 so that the boom is pivotal about the vertical axis of the pin 39. This pivotal movement permits the boom to be moved in a generally horizontal plane to any of a number of angular positions relative to the front to rear direction of tractor 12. One extreme of such movement is shown by phantom lines 16' in FIG. 1 where the boom is shown positioned to extend forwardly from the pivot pin and along one side of the tractor 12, the outer end of the boom then leading the inner end of the boom. A normal working position of the boom is shown in solid lines in FIGS. 1, 2 and 3, the boom in this position extending generally normally away from the side of the tractor 12.

A hydraulic ram 35 is provided interconnecting sub-frame 34 and boom 16 for effecting the described pivotal movement of the boom and this is controlled in a manner known per se enabling locking of the boom at any desired pivotal position.

Sub-frame 34 is interconnected with the remainder of support structure 14 in a fashion permitting raising and lowering of the sub-frame together with the boom as well as movement the sub-frame and boom in the front to rear direction of the tractor 12 and also to permit tilting of the boom 16. The manner in which tilting is effected is described first.

Figure 2:
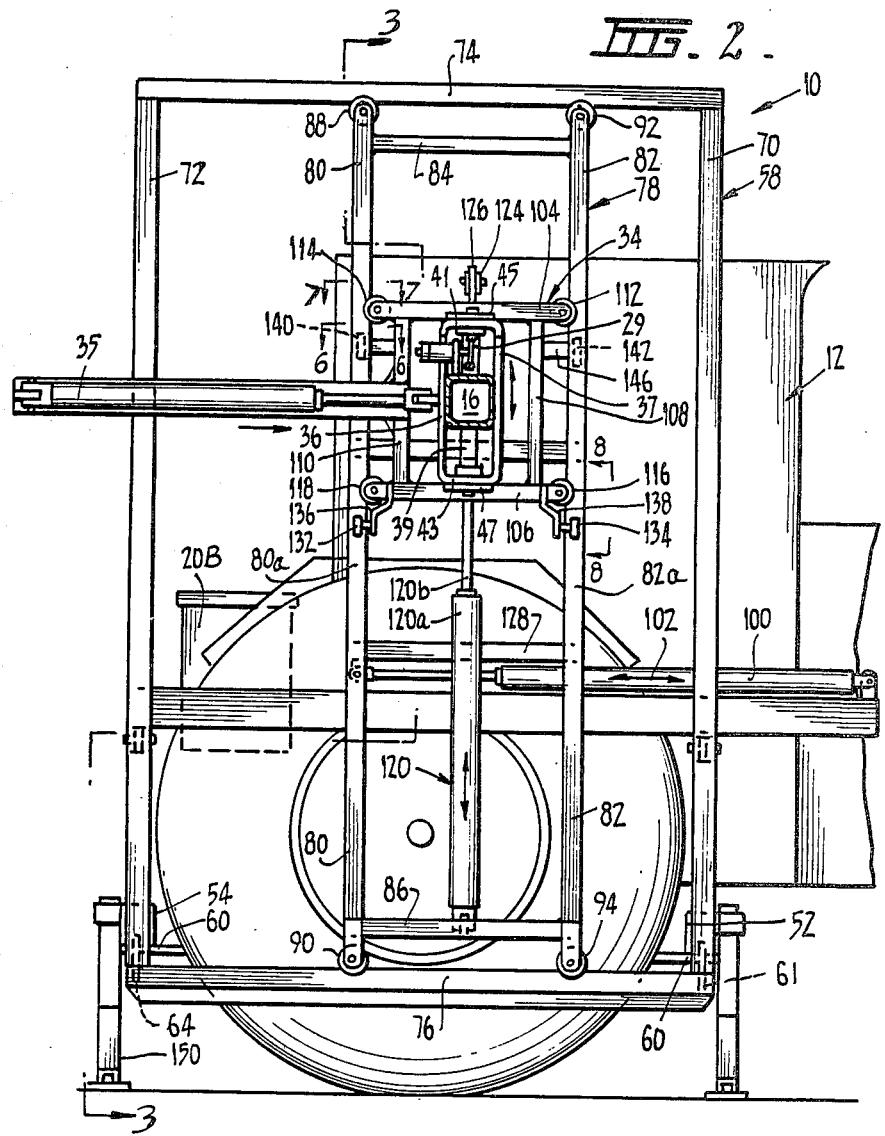
FIG. 2 is an enlarged view taken on the line 2—2 in FIG. 1.

As best shown in FIGS. 2 and 3, support structure 14 includes a mounting frame 50 which is rigidly affixed to the tractor 12. Frame 50 includes front and rear transverse members 52, 54, the front member 52 being affixed to the underside of the chassis of the tractor 12 and the member 54 being affixed to the tractor at the rear thereof, such as to the three point linkage of the tractor. These connections to the tractor may be effected by bolting so that the mounting frame 50 is removable from the tractor when necessary. The outer ends of members 52, 54 pivotally support forward and rear base portions of an upright rectangular second sub-frame 58. The pivotal interconnection is effected by means of pivot pins of which one pivot pin 60 only is visible (FIG. 3) which pivot pins pass through aligned openings in respective pairs of lugs 62, 64 on mounting frame 50 and sub-frame 58. Pins 60 are axially aligned on an axis which extends generally horizontally and in the front to rear direction of the tractor 12, this axis then forming the pivot axis for the sub-frame 58. Members 52, 54 carry upright extensions 52a, 54a and these extensions are interconnected with sub-frame 58 by respective hydraulic rams 66, 68. Rams 66, 68 are pivotally connected at one end to the respective extensions 52a, 54a and at the other end to sub-frame 58 at locations somewhat above the common axis of the pins 60. By this means, by extending or contracting the sub-frame 58 can be tilted to locations over a range of such locations including the generally vertical location shown in FIG. 3 to locations such as the location shown by phantom lines 58' in FIG. 3 at which the upper end of sub-frame 58 is so inclined as to cause the upper end thereof to be further outboard of the tractor 12 than the lower end thereof. Of course, during such pivotal movement, the boom 16 is likewise tilted, the position of the boom 16 when the sub-frame 58 is tilted to the location shown by phantom lines in FIG. 3 being shown by phantom lines 16''.

First sub-frame 34 is carried by sub-frame 58 in a manner permitting the aforedescribed raising and lowering of boom 16. More particularly, sub-frame 58 is of generally rectangular configuration having forward and rear upright members 70, 72 interconnected by upper and lower front to rear extending members 74, 76. Members 74 and 76 form rails on which run a third, intermediate, sub-frame 78. Third sub-frame 78 comprises two parallel upright members 80, 82 interconnected by upper and lower members 84, 86. Member 80 carries, at upper and lower ends thereof, flanged rollers 88, 90 and member 82 carries at upper and lower ends thereof similar rollers 92, 94. Rollers 88, 92 run on the underside of member 74 of sub-frame 58 and rollers 90, 94 run on the upper surface of member 76 of sub-frame 58. The rollers 88, 90, 92, 94 have side flanges, such as the side flanges 88a of roller 88 visible in FIG. 3, which limit movement of the sub-frame 78 in the direction normal to the plane of sub-frame 58.

Sub-frame 58 carries a horizontal member 98 which extends in the front to rear direction between upright members 70, 72. A hydraulic ram 100 is pivotally interconnected at one end to member 98 and at the other end to upright member 80 of sub-frame 78. By extending or contracting ram 100, it is possible to move sub-frame 78 relative to sub-frame 58, this movement occurring in the front to rear direction of the tractor 12 as indicated by arrow 102 in FIG. 2.

Sub-frame 34 itself comprises upper and lower horizontal members 104, 106 interconnected by front and rear upright members 108, 110. Front and rear ends of member 104 carry respective rollers 112, 114 and front and rear ends of member 106 carry respective rollers 116, 118. Rollers 112, 116 run against a rearmost upright face of member 82 of sub-frame 78 whilst rollers 114, 118 run against a forward upright face of member 80 of sub-frame 78. Rollers 112, 114, 116, 118 are of generally similar form, like rollers 88, 90, 92, 94 and as shown in FIG. 8, which shows roller 116. More particularly, the rollers 112, 114, 116, 118 have side flanges such as the side flanges 116a shown in FIG. 8 which are positioned to inner and outer faces of the respective upright member 80 or 82 of sub-frame 78 on which the roller runs, for the purpose of limiting movement of the sub-frame 78 in the direction transverse to the tractor 12. A hydraulic ram 120 has its casing 120a secured at the base thereof to the member 86 of sub-frame 78, so as to extend upwardly from this member. The piston 120b of ram 120 extends vertically from the top of casing 120a and carries at its upper end a freely rotatable sprocket wheel 124. A chain 126 has one end thereof connected to member 106 of sub-frame 34 and the other end connected to a fixed location relative to the ram casing. More particularly, this other end is connected to a member 128 which extends between members 80, 82 of sub-frame 78. By extending or contracting ram 120 then, the sprocket 124 is moved in the vertical direction to cause chain 126 to run around the sprocket and to move the end of the chain connected to sub-frame 34 vertically, thereby effecting corresponding vertical movement of the sub-frame 34 and boom 16.

Although, as described, the flanges such as flanges 116a on rollers 112, 114, 116 and 118 are provided for the purpose of limiting movement of sub-frame 34 in the direction transverse to the front to rear direction of tractor 12, (i.e. out of the common median planes of the three sub-frames 58, 78 and 34) the weight of the boom 16 is such that, in view of the cantilevered attachment thereof to the sub-frame 34, a very considerable turning moment is introduced tending to rotate the upper member 104 of sub-frame 34 away from the tractor 12 and the lower member 106 towards the tractor 12. This turning moment is such that very considerable frictional forces would be encountered between the inner surfaces of flanges such as flanges 116a of the rollers 114,118;112,116 where these engage the members 80,82. This frictional force, if allowed to exist, may interfere with the up and down movement of the sub-frame 34 and cause unnecessary wear on the rollers and/or members 80, 82. In order to guard against this, two further pairs of rollers are provided. One pair of these comprises rollers 132, 134 which are mounted to member 106 of sub-frame 34 via brackets 136, 138 and are positioned at the lower portion of sub-frame 34 such as to run on outermost faces 80a, 82a of members 80, 82 respectively. (FIG. 8). The other pair of rollers comprises rollers 140, 142 which are mounted by means of brackets 144, 146 on upright members 110, 108 of sub-frame 34 at the upper ends thereof. These rollers run against innermost faces of the upright members 80, 82. FIG. 6 more clearly shows one of these rollers, roller 140, together with its bracket 144 and the inner face 80b of the member 80 on which the roller runs. The rollers 140, 142, 132, 134 are so adjusted as to resist the above-described turning effect on the sub-frame 34 to ensure free up and down movement thereof.

Mounting frame 50 is provided with means for supporting the whole of structure 14 on the ground so as to resist turning forces applied to the frame structure as a whole as a result of the above-described turning moment induced by the cantilevered boom 16. More particularly, two foot members 150, 152 are provided, these being pivotally connected by pivot pins 154 to respective ones of the members 54, 52 of mounting frame 50. Hydraulic rams 158, 160 are pivotally connected at upper ends to upright extensions 54a, 52a of members 54, 52 and at lower ends to the respective foot members 150, 152. By extension of the rams 158, 160, the foot members 150, 152 can be moved to the position shown in the drawings where outer ends of these rest upon the ground surface on which the tractor runs at locations slightly outboard of the tractor wheels. By appropriate manipulation of the rams 158, 160, the feet members can be locked in these positions. By contraction of the rams 158, 160 the foot members can be pivoted about the front to rear extending axes of the pins 154 to locations (not shown) at which the outer ends of the foot members are lifted clear of the ground surface on which the tractor runs.

The described apparatus 10 has been found to be very satisfactory for use in sawing timber in difficult environments, such as in the bush. The tractor can be manoeuvred to be adjacent a log to be sawn. Then, by appropriate adjustment of the various hydraulic rams, the boom 16 can be positioned to extend in a desired cutting direction such as the position shown in FIG. 1 in solid lines, and the foot members 150, 152 moved to engage the ground surface. Then, the hydraulic motor 20 is set into operation to turn saw blade 24 and by operating hydraulic motor 30, the saw blade can be made to effect a desired cut lengthwise relative to the boom 16. During transport of the apparatus, the foot members 150, 152 are moved to clear the ground surface and the boom 16 moved to the location shown in phantom lines 16' in FIG. 1 thereby reducing the side-to-side dimension of the tractor and apparatus.

The described side mounting of the apparatus 10 to the tractor 12 is particularly convenient and permits ready attachment and detachment of the apparatus from the tractor.

Although not shown, it is possible to modify the apparatus 10 further to permit the axis of the saw blade 24 to be moved from the generally horizontal position at which it is substantially always oriented in the shown apparatus, over a range of positions in a generally vertical plane normal to the direction of extent of the boom 16. This could be effected, for example, by arranging the boom 16 to be pivotal about its axis or by mounting the motor 20 on a further sub-frame pivotal relative to carriage 18.

The hydraulic rams described and the hydraulic motor 30 may all be operated from the normal hydraulic system of the tractor 12. However, it is desirable that the hydraulic motor 20 be operated from a separate hydraulic system. In the described arrangement the separate hydraulic system is, for example, driven from the tractor power take-off. Thus, the hydraulic pump 20A of this system is visible in FIG. 1, for example, together with the separate hydraulic reservoir 20B of the separate system. It is preferred that the motor 30 be controlled by a control valve of a kind permitting infinite variation of motor speed between minimum and maximum speeds. Hydraulic lines (not shown for clarity) for conveying hydraulic fluid to and from the various rams and motors 20 and 30 are arranged in accordance with normal practice, those coupled to the carriage 18 being supported to run in inverted U-shaped configuration along two legs of an articulated inverted V-shaped frame made up of two elongate members 161 (FIG. 3) and 162 (FIG. 4). These members 161 and 162 are pivotally interconnected at their upper ends. At their lower ends, member 161 is pivotally connected to the inner end of the boom 16, whilst member 162 is pivotally connected to the carriage 18. The hydraulic lines to the carriage 18 are connected to the members 161, 162 so as to extend in the described inverted U-shaped configuration firstly up member 161 and thence down member 162 to the carriage 18. The legs of the inverted V-shaped frame as defined by the two members 161, 162 will, of course, undergo an opening and closing movement during movement of the carriage 18 along the length of the boom 16 to allow the hydraulic lines to be neatly retained without forming downwardly depending loops which might otherwise interfere with operation of the sawing apparatus.

I claim:

1. A sawing apparatus comprising a boom carrying a carriage movable lengthwise along the boom and at least adapted to carry a saw device, support structure adapted to be secured to a vehicle and carrying said boom, said boom being pivotal relative to said support structure so as to be positionable, by pivotal movement, at least at a first position at which, in use of the sawing apparatus with said support structure attached said vehicle and said carriage carrying said saw device, the boom extends sidewardly of the vehicle for use of the sawing apparatus by operating said saw device and moving it lengthwise of said boom, and at a second position at which, in use of the sawing apparatus with the support structure secured to said vehicle and said carriage carrying said saw device, the boom extends generally parallel to the driving direction of the vehicle for transport of the saw device, said support structure further including a first sub-frame, to which said boom is pivotally secured for said pivotal movement thereof, said first sub-frame being carried by a second sub-frame such that the first sub-frame, is movable, in use of the apparatus, generally lengthwise of said driving direction and generally vertically relative to said second sub-frame.

2. A sawing apparatus as claimed in claim 1, wherein said support structure further includes a mounting frame, the second sub-frame being pivotally mounted to the mounting frame so as to enable pivoting of the second sub-frame about an axis, which, in use of the apparatus, extends generally in said driving direction so that said pivoting of the second sub-frame effects tilting of said second frame and thus also tilting of said boom.

3. A sawing apparatus as claimed in claim 2, said support structure including a third sub-frame, which interconnects said first and second sub-frames, one of said first and third sub-frames being, in use movable generally lengthwise of said driving direction and the other being, in use, movable generally vertically whereby, by movement of said first and third sub-frames, the first sub-frame can be positioned at any of a range of positions relative to the second sub-frame.

4. A sawing apparatus as claimed in claim 3, wherein said first sub-frame is in use movable vertically relative to said third sub-frame and said third sub-frame is in use movable in said driving direction relative to said second sub-frame, said second sub-frame being slidably carried by said third sub-frame and said first sub-frame being slidably carried by said third sub-frame.

5. A sawing apparatus as claimed in claim 4, wherein said sub-frames are generally coplanar and are positioned so as to extend in upright fashion adjacent one side of the vehicle to extend in the said driving direction in use of the apparatus.

6. A sawing apparatus as claimed in claim 3, wherein said mounting frame is arranged to be connected to the vehicle so that the first and second sub-frames are then positioned to one side of the vehicle.

7. A sawing apparatus as claimed in claim 2, wherein said mounting frame carries foot members movable in use of the apparatus to engage the ground to resist turning of the vehicle and attached apparatus due to weight of said boom when in said first position.

8. A sawing apparatus as claimed in claim 3, wherein extensible members are provided operable to effect movement of the first, second and third sub-frames and for setting these at desired positions for operation of the saw device.

9. A sawing apparatus as claimed in any one of the preceding claims, wherein said saw device comprises a circular saw carried by said carriage.

10. A combination vehicle and sawing apparatus comprising a boom carrying a carriage movable lengthwise along the boom and at least adapted to carry a saw device, support structure secured to the vehicle and carrying said boom, said boom being pivotal relative to said support structure so as to be positionable, by pivotal movement, at least at a first position at which, with said carriage carrying said saw device, the boom extends sidewardly of the vehicle for use of the sawing apparatus by operating said saw device and moving it lengthwise of said boom, and at a second position at which the boom extends generally parallel to the driving direction of the vehicle for transport of the saw device, said support structure further including a first sub-frame to which said boom is pivotally secured for said pivotal movement thereof, said first sub-frame being carried by a second sub-frame such that the first sub-frame is movable generally lengthwise of said driving direction and generally vertically relative to said second sub-frame.

11. A combination vehicle and sawing apparatus as claimed in claim 10, wherein said support structure further includes a mounting frame the second sub-frame being pivotally mounted to the mounting frame so as to enable pivoting of the second sub-frame about an axis which extends generally in said driving direction so that said pivoting of the second sub-frame effects tilting of said second frame and thus also tilting of said boom.

12. A combination vehicle and sawing apparatus as claimed in claim 11, said support structure including a third sub-frame, which interconnects said first and second sub-frames, one of said first and third sub-frames being movable generally lengthwise of said driving direction and the other being movable generally vertically whereby, by movement of said first and third sub-frames, the first sub-frame can be positioned at any of a range of positions relative to the second sub-frame.

13. A combination vehicle and sawing apparatus as claimed in claim 12, wherein said first sub-frame is movable vertically relative to said third sub-frame and said third sub-frame is movable in said driving direction relative to said second sub-frame, said second sub-frame being slidably carried by said third sub-frame and said first sub-frame being slidably carried by said third sub-frame.

14. A combination vehicle and sawing apparatus as claimed in claim 13, wherein said sub-frames are generally coplanar and are positioned so as to extend in upright fashion adjacent one side of the vehicle to extend in the said driving direction.

15. A combination vehicle and sawing apparatus as claimed in claim 12, wherein said mounting frame is connected to the vehicle so that the first and second sub-frames are positioned to one side of the vehicle.

16. A combination vehicle and sawing apparatus as claimed in claim 11, wherein said mounting frame carries foot members movable to engage the ground to resist turning of the vehicle and attached apparatus due to weight of said boom when in said first position.

17. A combination vehicle and sawing apparatus as claimed in claim 12, wherein extensible members are provided operable to effect movement of the first, second and third sub-frames and for setting these at desired positions for operation of the saw device.

18. A combination vehicle and sawing apparatus as claimed in any one of claims 10–17, wherein said saw device comprises a circular saw carried by said carriage.

* * * * *